United States Patent

Sawyer

Patent Number: 5,303,274
Date of Patent: Apr. 12, 1994

[54] RETROFITTABLE PASSIVE CONTAINMENT COOLING SYSTEM

[75] Inventor: Craig D. Sawyer, Los Gatos, Calif.

[73] Assignee: General Electric Company, San Jose, Calif.

[21] Appl. No.: 6,556

[22] Filed: Jan. 21, 1993

[51] Int. Cl.⁵ .................................................. G21C 9/00
[52] U.S. Cl. .................................... 376/283; 376/298; 376/299
[58] Field of Search ................. 376/283, 298, 299, 282

[56] References Cited

U.S. PATENT DOCUMENTS

| | | | |
|---|---|---|---|
| 5,059,385 | 10/1991 | Gluntz et al. | 376/283 |
| 5,082,619 | 1/1992 | Sawyer | 376/283 |
| 5,106,571 | 4/1992 | Wade et al. | 376/283 |
| 5,126,099 | 6/1992 | Van Kuijk | 376/283 |

Primary Examiner—Daniel D. Wasil
Attorney, Agent, or Firm—J. S. Beulick

[57] ABSTRACT

A satellite heat removal means can be embodied as an original nuclear system feature but is especially adapted to be retrofitted to an existing nuclear reactor system to serve optionally to supplement heat removal from the system nuclear reactor containment upon happening of a LOCA, and to assume all system containment drywell venting in the event reactor core meltdown results in breach of the containment floor structure separating the containment drywell and wetwell space which breach would deprive the containment of a space to which a non-condensable fraction of LOCA generated heated fluid in the containment could be vented, cooled and stored. The satellite heat removal means includes a structural external of but preferably situated alongside the nuclear reactor containment. A heat exchanger surrounded by a pool of cooling water is located in an upper chamber of the structure while a pool of water is present in a lower chamber of the structure. The heat exchanger is communicated with the containment drywell by inlet and outlet conduits so that heated fluid in the containment can enter and be cooled in the heat exchanger with a cooled condensate fraction being returned from the heat exchanger to the containment drywell, and a non-condensable gas fraction vented to the pool of water in the lower chamber. A gas space above the lower chamber pool of water substitutes as the wetwell gas space to which non-condensables vent in place of the containment wetwell gas space that was breached and thus merged with the containment drywell space as an incident of the LOCA.

8 Claims, 1 Drawing Sheet

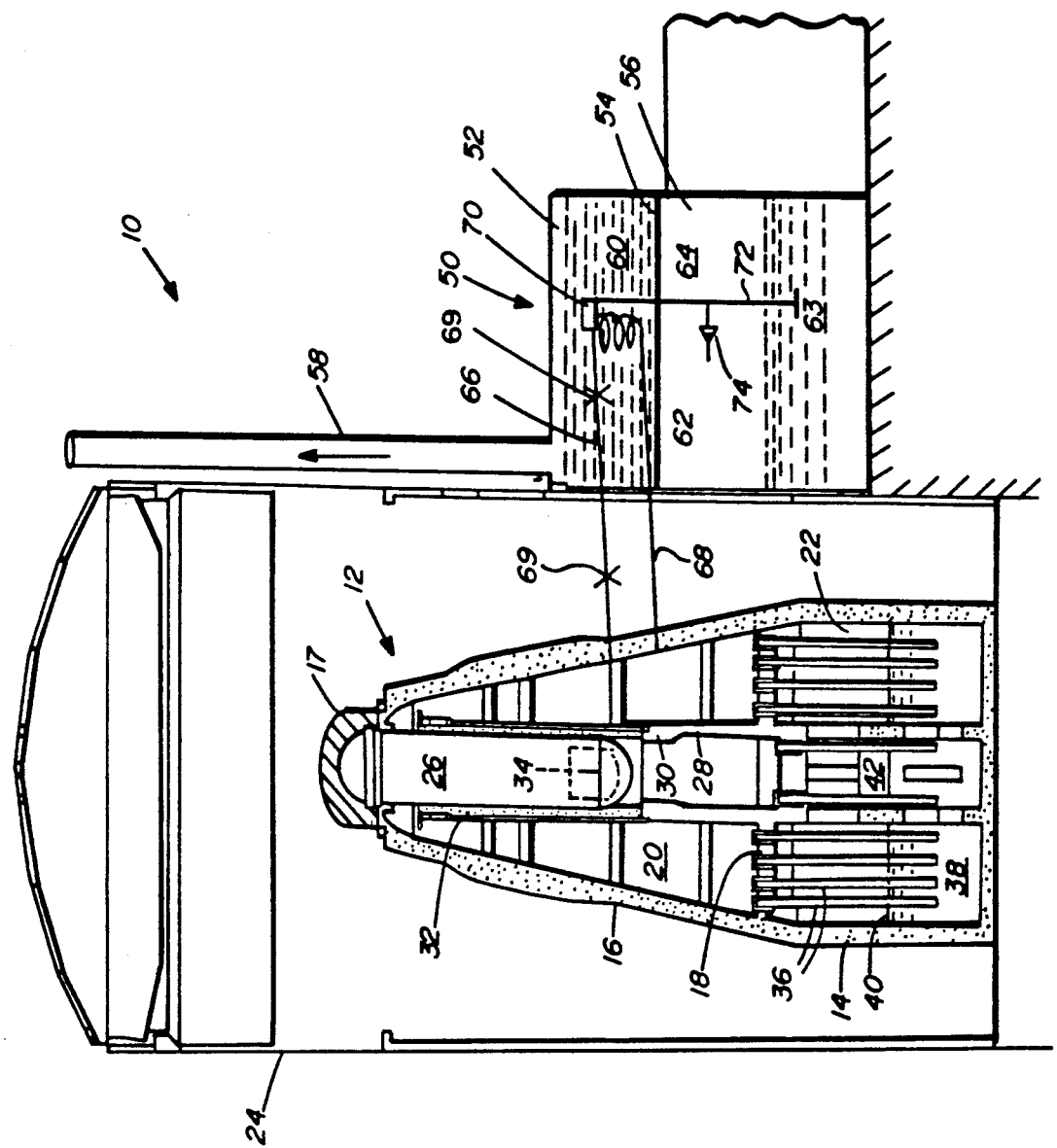

RETROFITTABLE PASSIVE CONTAINMENT COOLING SYSTEM

BACKGROUND OF THE INVENTION

The present invention relates to passive cooling of a nuclear reactor containment. The invention is particularly directed to an isolation condenser type passive cooling system which can be installed externally of the nuclear reactor containment as well as building structure in which the containment is situated, the cooling system being such as minimizes need to penetrate the containment and building enclosure with cooling system components.

U.S. Pat. Nos. 5,059,385, 5,082,619 and 5,106,571 disclose use of isolation condensers in connection with passive removal of initial and decay heat loads generated in a nuclear reactor system containment as a result of and upon occurrence of a LOCA, i.e., a loss-of-coolant accident in the system.

The cooling systems disclosed in these pending applications also can dissipate initial heat by venting the reactor pressure vessel and/or the containment drywell space to a suppression pool of water confined in a chamber surrounding the reactor pressure vessel. Venting to the suppression pool also can be used with respect to condensate recovery of the isolation condensers, and non-condensable gasses such as nitrogen, which are cooled in an isolation condenser and separated from the condensate.

Venting from the containment drywell of heated, pressurized fluid and venting of condensate and non-condensable gasses from the isolation condensers to the suppression pool, is possible because a pressure differential exists between these fluids and gasses on the one hand, and the airspace above the suppression pool water on the other hand.

In other nuclear reactor systems, LOCA heat loads are dissipated in different manner. For example, a type of nuclear system that was built in some numbers in the 1960's and 1970's has a containment which includes an upper space in which the nuclear reactor is disposed, and a lower space defining a suppression pool chamber in which cooling water is present with there being an airspace above the water. The upper and lower spaces are separated by a horizontal structural element, e.g., a concrete floor. A concrete pedestal extends upwardly a distance from the concrete floor in the upper space and serves as a mounting on which the reactor pressure vessel is received and supported. A plurality of vertically disposed vent tubes are arranged in circle array in the floor and have entry ends communicating with the upper space, lower outlet ends of these vent tubes locating submerged in the suppression pool water.

On happening of a LOCA, initial heat is dissipated by heated, pressurized fluid present in the upper space or drywell venting through the vent pipes into the suppression pool wherein steam condenses and non-condensable gasses such as nitrogen cool and vent from the pool water to the airspace above the water. Initial heat also can be dissipated by recirculating water from the reactor vessel to a cooling operation (unless a reactor vessel rupture is present), which cooling operation may for environmental safety reason, involve an intermediate heat exchange location and a final heat exchange location, the latter being one outside the containment. Recirculation of the suppression pool water in like manner can be practiced to take into account that the suppression pool will heat up quite quickly. Decay heat dissipation will be handled by the same suppression pool and reactor vessel water recirculation functions. It is to be noted though that these systems do not employ passive heat removal capacity.

While the last-discussed systems are designed to handle any anticipated LOCA heat load, there is a drawback and potential risk that the cooling function of the suppression pool as it regards non-condensable gasses, can be rendered ineffective. Such happening can come about if a reactor core meltdown attends the LOCA. In that event, the meltdown may cause or contribute to a breaching of the concrete floor structure thereby communicating the drywell of the upper space directly with the airspace above the pool in the lower space rather than such communication being indirect through the suppression pool first. The result is that no lower pressure space exists in the containment to which the higher pressure non-condensable gasses can be vented and cooled by passage through the suppression pool.

The systems with the above-recited shortcoming embody massive containment structures. This works against conveniently and simply making system modifications to counter the effects of meltdown as described above and provide for cooling, both as to initial heat removal and the longer term decay heat dissipation.

OBJECTS AND SUMMARY OF THE INVENTION

Accordingly, it is an object of the invention to provide nuclear reactor system satellite heat removal means in the form of a passive containment cooling system specially intended to be retrofittable to an existing nuclear reactor system of a type wherein a drywell space containing the nuclear reactor is located above and over a suppression pool which overcomes the drawbacks of the prior art.

It is a further object of the invention to provide a passive containment cooling system which includes a wetwell airspace that serves as a location to which LOCA produced non-condensable gasses present in the containment can be vented in the event a reactor meltdown causes breach in the floor separating the containment drywell from an underlying suppression pool wetwell airspace, such happening thereby destroying presence in the containment of a lower pressure space to which gasses at a higher pressure can be vented.

It is a still further object of the invention to readily and conveniently provide passive containment cooling for nuclear reactor systems of types heretofore lacking such cooling capacity.

Briefly stated, there is provided a satellite heat removal means which can be embodied in a system as part of an original design but more particularly is intended to be retrofitted to an existing nuclear reactor system to serve optionally to supplement heat removal from the system nuclear reactor containment upon happening of a LOCA, and to assume all system containment drywell venting in the event reactor core meltdown results in breach of the containment floor structure separating the containment drywell and wetwell spaces, which breach would deprive the containment of a space to which non-condensable fraction of LOCA generated heated fluid in the containment could be vented, cooled and stored. The satellite heat removal means includes a structure external of but preferably situated alongside the nuclear reactor containment, a heat exchanger is disposed in a pool of cooling water located in an upper chamber of that structure, while a pool of water also is present in a structure lower chamber. The heat exchanger is communicated with the containment drywell by inlet and outlet conduits so that heated fluid in the containment can enter and be cooled in the heat exchanger with a cooled condensate fraction being returned to the drywell, and a non-condensable gas fraction vented to the lower chamber pool of water. A gas space above the lower chamber pool of water substitutes as the wetwell gas space to which non-condensables vent in place of the containment wetwell gas space that was breached and thus merged with the containment drywell space as an incident of the LOCA.

In accordance with these and other objects of the invention, there is provided a nuclear reactor system which includes a containment structure having an upper drywell space and a lower wetwell space, these spaces being separated one from another by an intervening floor member. A nuclear reactor pressure vessel is disposed in the drywell space and a reactor core is present within the pressure vessel. A suppression pool of water is confined in the wetwell space and a gas space is present above a normal level of water in this suppression pool. Means are provided for venting a heated and pressurized fluid present in the structure drywell space incident a pressure vessel loss-of-coolant accident to a submerged location in the suppression pool thereby to remove heat from and reduce pressure in the drywell space by condensing a water fraction of the heated fluid in the suppression pool water, a non-condensable fraction of said heated fluid venting to the wetwell gas space. Satellite heat removal means are operable for effecting additional drywell heat removal during the accident and all drywell venting in the event the floor member structure is breached by a core meltdown during the loss-of-coolant accident with consequent merger of the gas space and drywell so that the containment lacks a space to which the heated fluid non-condensable fraction can vent. The satellite heating removal means includes a satellite structure external of the containment structure and has upper and lower chambers. At least one heat exchanger is located in the upper chamber and a pool of cooling water in the upper chamber surrounds the heat exchanger. Vent means communicate the cooling water with ambient environment. An inlet conduit communicates an inlet end of the heat exchanger with the containment drywell whereby heated fluid present in the containment drywell can flow into the heat exchanger with the containment drywell. An outlet conduit communicates an outlet end of the heat exchanger with the containment drywell. A condensate/non-condensable gas collector is in said outlet conduit. Condensate collected in the collector passes therefrom to the containment drywell and a non-condensable gas fraction collected in the collector passes into a vent pipe which vent pipe outlets submerged below a level of water in a water pool present in the lower chamber, there being a gas space in that chamber above the water level.

The above, and other objects, features and advantages of the present invention will become apparent from the following description read in conjunction with the accompanying drawings, in which like reference numerals designate the same elements.

BRIEF DESCRIPTION OF THE DRAWING

The accompanying single FIGURE of drawing is a schematic depiction in elevation of a nuclear reactor system embodying a satellite or stand-by passive containment cooling system constructed in accordance with the principles of the present invention.

DETAILED DESCRIPTION OF THE PREFERRED EMBODIMENT

The present invention is concerned with provision of a satellite or stand-by passive containment cooling system for a nuclear reactor system. It can be embodied as part of an original nuclear reactor system construction, but it is primarily intended for retrofitting an existing nuclear reactor system with passive cooling capacity. More specifically, the invention is applicable to retrofitting nuclear reactor systems of the type wherein a suppression pool is confined in a separate space directly underlying the drywell space in which the nuclear reactor pressure vessel is located, this containment configuration being one in which a reactor core meltdown could result in rending of the floor separating the drywell and suppression pool space thereby creating but a single space in the containment from whence no venting of pressurized, heated non-condensables would be possible.

Referring to the drawing, the nuclear reactor system 10 includes a heavy reinforced concrete containment structure 12 which has a base as at 13, a widened, generally cylindrical lower part 14 and a, e.g., tapered, conical or cylindrical upper part 16, there being a heavy cover unit 17 at the top of the structure. Containment structure 12 includes a horizontal floor 18 located proximal the juncture of parts 14 and 16, and this floor separates the containment interior into an upper or drywell space 20 and a lower or suppression pool space 22.

The containment structure 12 can be located within a larger building enclosure shown generally at 24 and which serves to house other equipment and devices used in the system, this other equipment, devices, flooring etc not being depicted but being readily understood by one of ordinary skill in the art as being present in the building and employed in conjunction with operation, maintenance, fuel replenishment and like tasks. One of ordinary skill in the art will readily recognize the types of such stystems in which the invention can be employed, and also note the herein depicted system is representative of the Assignee's BWR Mark II system.

A nuclear reactor pressure vessel 26 is located in the drywell space 20 of structure 12, being supported on a hollow cylindrical pedestal 28 extending up some distance from and generally formed as an integral part of the floor 18. The pressure vessel sits on a saddle part 30 at the top of the pedestal 28 and a concrete bio-shield 32 encircles the vessel. Nuclear reactor core 34 is located within the pressure vessel as shown in dashed lines. Other components of the system such as steam and condensate feed lines, and reactor core control rod assemblies are not depicted as same is not necessary for proper understanding of the invention.

A plurality of vertically disposed vent pipes 36 are arrayed around the floor 18 and have entry ends at the floor which are in communication with the drywell space 20. The pipes 36 extend down through the floor and into a pool of water 38 in the space 22, lower outlet ends of these pipes locating submerged a distance below the level 40 of pool 38, there being an airspace 42 above the pool of water, gas flow communication between airspace 42 and drywell 28 being only possible via passage through the pool of water 38.

In the event of a LOCA which may involve one or more of a break in a steam pipe or the pressure vessel, or a loss of coolant in the pressure vessel from other cause, there will be an immediate initial heat buildup in the drywell 28 represented by presence of highly heated steam and non-condensable gasses, chiefly nitrogen in the drywell. Due to the high steam/gas pressure, it will vent through pipes 36 into pool 38, the steam condensing, and the non-condensable gasses being cooled in the pool and venting therefrom to airspace 42. As noted earlier, recirculation of the pool water to a cooling operation outside the containment will be carried out since the buildup of heat in the pool will be rapid and of high magnitude. Recirculation of the feed water in the pressure vessel to a cooling operation as a containment heat removal agency also may be employed depending on whether or not the LOCA cause involves rupture in that vessel.

Should the accident be an event that involves core meltdown with an ensuing breach in the structure of floor structure 18, the airspace 42 is opened to and becomes merged with the drywell atmosphere so there no longer exists a separate space to which non-condensable fraction of heated fluid in the drywell can be passed to effect cooling and venting of same. To offset this loss of wetwell cooling and venting in the containment structure as such, there is provided satellite heat removal means which can supplement drywell heat removal during an accident wherein the containment wetwell remains intact, but which also can assume all cooling function if core meltdown has rendered the containment wetwell cooling inoperable. This satellite heat removal means is described in detail next.

Referring to the drawing Figure, a satellite building 50 is erected adjacent to large building enclosure 24, the satellite structure being either constructed as part of the original system erection, but more usually and in line with the type of system with which it is most efficaciously used, being a retrofit installation added on subsequent to system installation. Building 50 defines a structure having space enclosing an upper chamber 52 therein which is separated by a floor or slab 54 from a lower space constituting a lower chamber 56. A vent stack 58 communicates upper chamber 52 with outside or ambient environment.

A pool of cooling water 60 is present in upper chamber 52, and at least one isolation condenser 62 will be submerged in pool 60. Lower chamber 56 also contains a water pool 63 which in volume should be at least about as large as the water volume capacity of suppression pool 38. Gas space 64 above pool 63 should be at least as large but more preferably about two to three times the volume of the containment wetwell space 42.

An inlet to the isolation condenser 62 is connected to the containment drywell 20 by means of an inlet conduit 66, and an outlet from the isolation condenser is communicated to the containment drywell by an outlet conduit 68. One or more normally open valves 69 can be disposed in inlet conduit 66, and a condensate/non-condensable gas collector 70 can be fitted to the outlet end of the isolation condenser.

The inlet and outlet conduits 66, 68 it will be noted have communication with the drywell elevated some location above floor 18 and other parts of the containment so that same are above any anticipated flood level of water as might be expected to invest the containment during a LOCA or core melt down where the suppression pool and water from the pressure vessel become one pool. It also is seen that these conduits are inclined so that the ends communicating with the containment are located at an elevation below the conduit ends connected to the isolation condenser.

A vent pipe 72 connects the gas collector 70 with a submerged location in water pool 63, and a vacuum breaker 74 is fitted on the vent pipe at a location in the lower chamber gas space so it can operate to dmit gas from the gas space to the vent pipe whenever a reduced pressure condition in drywell 20 is such that it would induce a siphon effect draw of water from pool 63 to the drywell via isolation condenser 62.

During an accident not involving core meltdown, the satellite heat removal means will provide supplemental cooling for the drywell. Highly heated fluid present in the drywell comprising steam and non-condensable gasses can access the isolation condenser 62 by way of inlet conduit 66, be cooled so that steam converted to water condensate will return by way of the outlet conduit 68 to the drywell. Non-condensables will be separated and collected in gas collector 70 for outlet via vent pipe 72 to the pool 63, from which the cooled gas vents to gas space 64.

Cooling is by way of transfer of heat to the water in pool 60, water evaporating from the pool and this in turn venting to atmosphere by way of stack 58. Make up or replenishment for pool 60 can be provided in known manner.

Where core meltdown occurs and the floor structure 18 is breached, all drywell heat removal will be accomplished with the satellite heat removal means.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a nuclear reactor system which includes
    a containment structure having an upper drywell space and a lower wetwell space, the said spaces being separated one from the other by an intervening floor member,
    a nuclear reactor pressure vessel disposed in the drywell space, there being a reactor core within said pressure vessel,
    a suppression pool of water confined in the wetwell space, there being a gas space above a normal level of the water in the suppression pool, and
    means for venting a heated and pressurized fluid present in said structure drywell space incident a pressure vessel loss-of-coolant accident to a submerged location in said suppression pool thereby to remove heat from and reduce pressure in the drywell space by condensing a water fraction of said heated fluid in said suppression pool water, a non-condensable fraction of said heated fluid venting to the wetwell gas space,
    satellite heat removal means operable for effecting additional drywell heat removal during such accident and all drywell venting in the event the floor member structure is breached by a core meltdown during the loss-of-coolant accident with consequent merger of the gas space and drywell so that the containment lacks a space to which the heated fluid non-condensable fraction can vent, said satellite heat removal means comprising a satellite structure external of said containment and set adjacent said containment structure, said satellite having upper and lower chambers, at least one heat exchanger in said upper chamber, a pool of cooling water in said upper chamber surrounding said heat exchanger, vent means communicating the cooling water pool with an ambient environment, an inlet conduit communicating an inlet end of the heat exchanger with the containment drywell whereby heated fluid present in the containment drywell can flow into the heat exchanger and be cooled to condense a water fraction therefrom, an outlet conduit communicating an outlet end of the heat exchanger with the containment drywell, a condensate/non-condensable gas collector in said outlet conduit, condensate collected in the collector passing therefrom to the containment drywell, a non-condensable gas fraction collected in the collector passing into a vent pipe, and a pool of water in said lower chamber, there being a gas space in said lower chamber above a level of the water pool therein, the vent pipe having an outlet end submerged below said water pool level.

2. The nuclear system of claim 1 in which the volume of the lower chamber water pool in the satellite structure is at least about the same as the volume of water present in the containment structure suppression pool.

3. The nuclear system of claim 1 in which the gas space in the lower chamber of the satellite structure is at least as large as that above the suppression pool in the containment structure wetwell.

4. The nuclear system of claim 3 in which the satellite structure lower chamber gas space is about 2 to about 3 times larger than that in the containment wetwell space.

5. The nuclear system of claim 1 in which the vent pipe extends down from the satellite upper chamber and through the gas space above the satellite lower chamber water pool, and a vacuum breaker carried in said vent pipe at a location in lower chamber gas space and operable to admit gas from the said gas space into the vent pipe whenever a reduced pressure condition in the drywell is such that would induce a siphon draw of water from said lower chamber pool of water to the containment drywell via the heat exchanger.

6. The nuclear system of claim 1 in which the inlet and outlet conduits which communicate the heat exchanger with the containment drywell each have a conduit end present in the containment drywell which said conduit ends are situated at an elevation below that at which opposite ends of the respective conduits are situated.

7. The nuclear system of claim 1 comprising a normally open valve disposed in at least the inlet conduit.

8. The nuclear system of claim 1 in which the inlet and outlet conduits have ends communicating with the containment drywell at locations above any flood level therein to which the liquid in the suppression pool and that in the reactor pressure vessel could rise during loss-of-coolant accident.

* * * * *